United States Patent [19]

Nakagawa

[11] Patent Number: 4,484,316

[45] Date of Patent: Nov. 20, 1984

[54] ACOUSTIC VERMIN-REPELLENT DEVICE

[76] Inventor: Susumu Nakagawa, 5-28-11-608, Higashigotanda, Shinagawa-ku, Tokyo, Japan

[21] Appl. No.: 504,785

[22] Filed: Jun. 16, 1983

[51] Int. Cl.³ .............................................. H04B 1/02
[52] U.S. Cl. ..................................................... 367/139
[58] Field of Search ................ 367/139; 181/152, 155, 181/159, 156, 175, 187, 193, 194, 199

[56] References Cited

U.S. PATENT DOCUMENTS 3,873,960 3/1975 Gates, Sr. ............................. 367/139
4,356,881 11/1982 Lowell ................................. 181/156

Primary Examiner—Theodore M. Blum
Attorney, Agent, or Firm—Wenderoth, Lind & Ponack

[57] ABSTRACT

An acoustic vermin-repellent device comprises a trumpet-shaped main body, a first bowl-shaped reflection plate disposed in the vicinity of the small diameter end portion within the main body, a second bowl-shaped reflection plate disposed in the vicinity of the large diameter end portion within the main body so as to have its concave surface opposed to the concave surface of the first reflection plate, an acoustic generator attached to the concave surface of the second reflection plate so as to be directed to the concave surface of the first reflection plate, actuating means for causing the acoustic generator to fulfill its function, and a plurality of outlets formed around the second reflection plate for emitting out of the main body acoustic waves to be generated by the acoustic generator.

7 Claims, 6 Drawing Figures

ACOUSTIC VERMIN-REPELLENT DEVICE

BACKGROUND OF THE INVENTION

1. Field of the Invention

The present invention relates to an acoustic vermin-repellent device utilizing behavior of noxious insects, such as mosquitoes etc., which exhibit negative taxis against given acoustic waves.

2. Description of the Prior Art

There have heretofore been proposed various mosquito-repellent devices. One of these devices is disclosed in Japanese Utility Model Publication No. SHO 50(1975)-43490, for example. This mosquito-repellent device has a construction such that an acoustic generator is assembled in a small container and shows disadvantages that the mosquito-repelling effect has been limited to a very small extent, i.e. to such an extent that a person only that carries the device can enjoy the effect and that there is a fair possibility of the mosquito-repelling effect being lowered out of doors due to the fact that the acoustic waves are absorbed in the air or dispersed by a wind.

SUMMARY OF THE INVENTION

In view of the disadvantages described above, the present invention has been accomplished.

One object of the present invention is to provide an acoustic vermin-repellent device capable of manifesting the vermin-repelling effect even at a great distance and efficiently repelling noxious insects within a concentrated range in a desired direction.

To attain the object described above, according to the present invention, there is provided an acoustic vermin-repellent device which comprises a trumpet-shaped main body, a first bowl-shaped reflection plate disposed in the vicinity of the small diameter end portion within the trumpet-shaped main body, a second bowl-shaped reflection plate disposed in the vicinity of the large diameter end portion within the trumpet-shaped main body so as to have its concave surface opposed to the concave surface of the first bowl-shaped reflection plate, an acoustic generator attached to the concave surface of the second bowl-shaped reflection plate so as to be directed to the concave surface of the first bowl-shaped reflection plate, actuating means for causing the acoustic generator to fulfill its function, and a plurality of outlets formed around the second bowl-shaped reflection plate for emitting out of the trumpet-shaped main body acoustic waves to be generated by the acoustic generator.

The aforementioned and other objects and characteristic features of the present invention will become apparent from the following description which is given in detail with reference to the accompanying drawings.

DESCRIPTION OF THE PREFERRED EMBODIMENT

Figure 1:
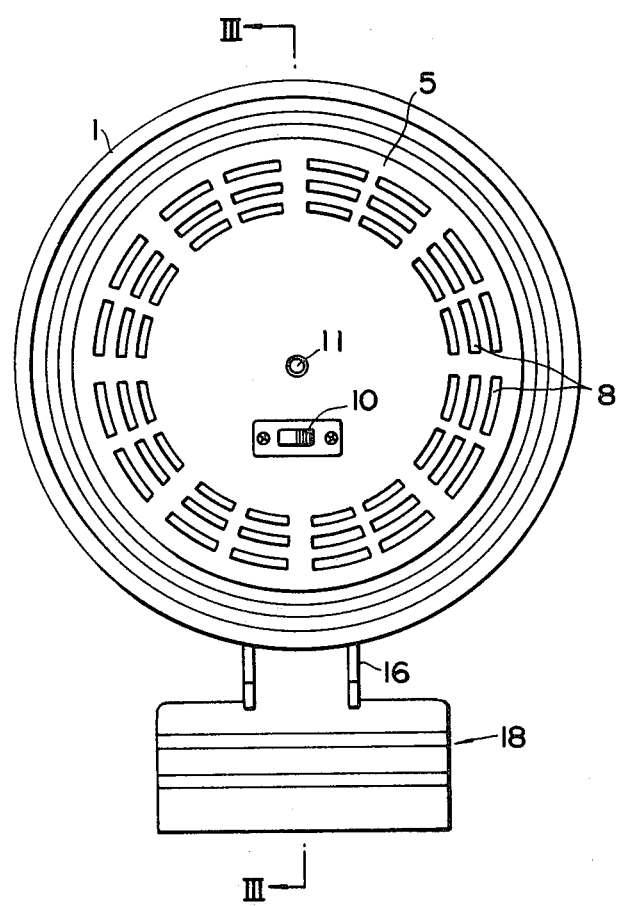
FIG. 1 is a front view illustrating one embodiment of the acoustic vermin-repellent device according to the present invention.
Figure 2:
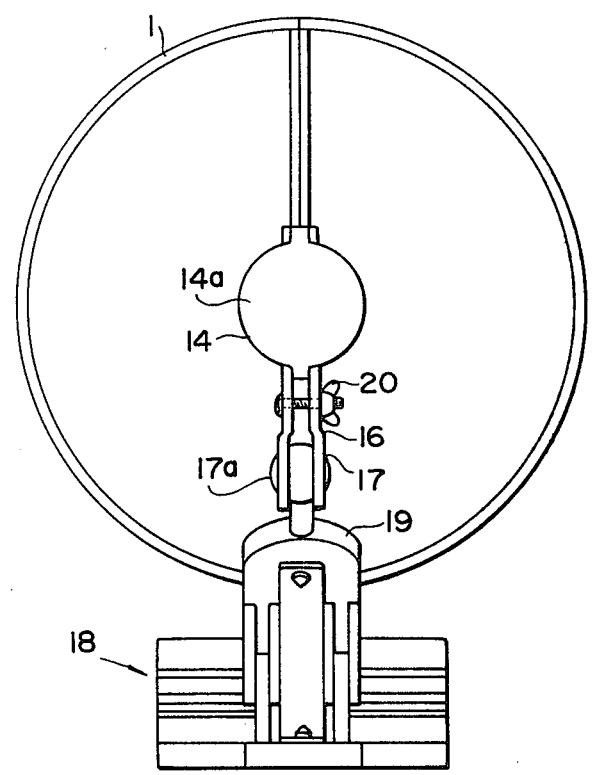
FIG. 2 is a rear view of the same embodiment.
Figure 3:
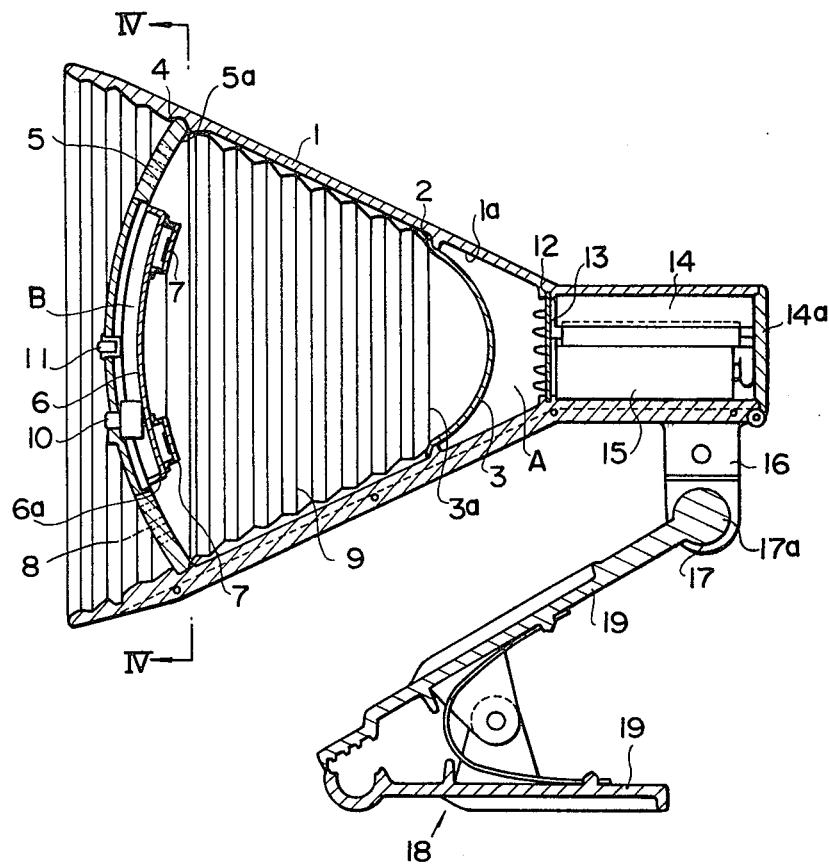
FIG. 3 is a cross section taken along the line III—III in FIG. 1.

The present invention will now be described in detail with reference to the illustrated embodiment.

Denoted by 1 is a trumpet-shaped main body of the acoustic vermin-repellent device according to the present invention, which is provided in the interior thereof with a first bowl-shaped reflection plate 3 in the vicinity of the small diameter end portion and with a second bowl-shaped reflection plate 6 in the vicinity of the large diameter end portion of the trumpet-shaped main body so that the concave surfaces of the two reflection plates 3 and 6 are opposed to each other.

The first reflection plate 3 is fixed to the main body 1 by fitting the open edge 3a of the first reflection plate in with a groove 2 formed in the inner circumferential surface 1a of the main body. There is left a room A between the convex surface of the first reflection plate and the small diameter end portion of the main body.

To the inner portion of the main body 1 in the vicinity of the large diameter end portion thereof is fixed a bowl-shaped front panel 5 with the edge 5a thereof fitted in with a groove 4 formed in the inner portion of the man body to thereby stop up the front opening of the main body. The aforementioned second reflection plate 6 has its support legs 6a attached to the concave surface of the front panel 5 so that the second reflection plate may be disposed at the center of the front panel and a room B is left between the convex surface of the second reflection plate and the concave surface of the front panel.

Figure 6:
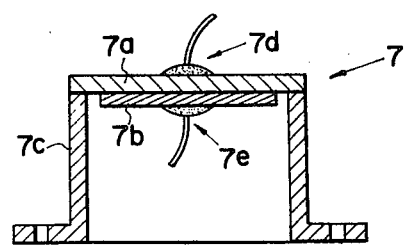
FIG. 6 is an enlarged cross section showing an acoustic generator to be used in the embodiment of the present invention.
Figure 4:
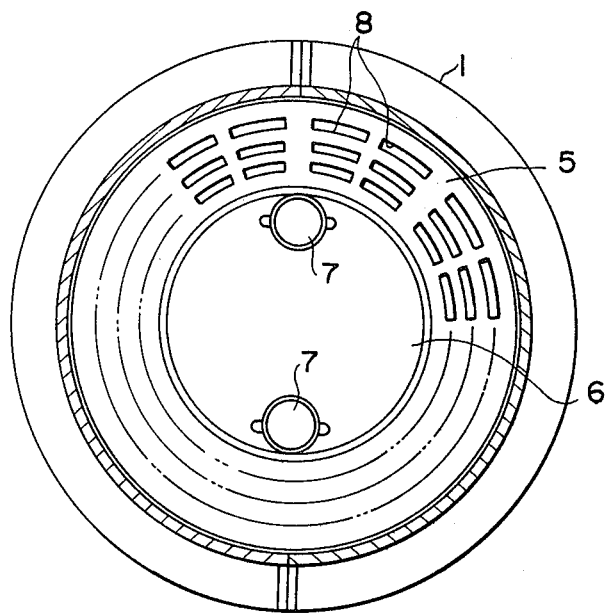
FIG. 4 is a cross section taken along the line IV—IV in FIG. 3.
Figure 5:
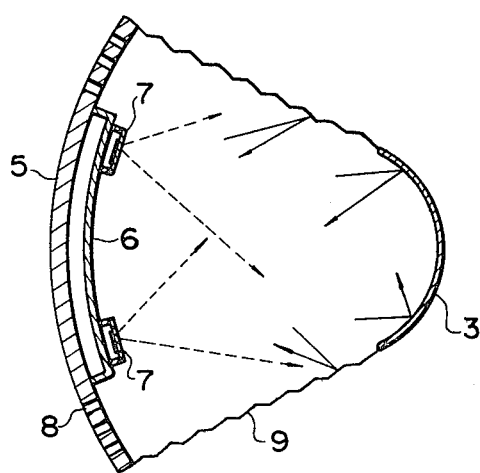
FIG. 5 is an explanatory cross section showing reflection of the acoustic waves.

To the concave surface of the second reflection plate 6 is attached an acoustic generator 7. When a plurality of acoustic generators 7 are arranged thereon, they are disposed symmetrically relative to imaginary lines which intersect the center of the concave surface of the second reflection plate at positions as close to the circumferential edge portion of the second reflection plate 6 as possible and are opposed to the first reflection plate 3. The acoustic generator 7 comprises, as illustrated in FIG. 6, a composite (bimorph) of a metallic plate 7a and ceramics 7b, a cylinder 7c having its upper end fixed to the lower edge portion of the composite and its lower end attached to the second reflection plate 6, and a pair of electrodes 7d and 7e. The portion of the front panel 5 around the second reflection plate 6 has a plurality of outlets 8 bored therein for emitting acoustic waves out of the main body 1.

A bellows echo plate 9 is attached to the inner circumferential surface 1a of the main body 1 between the first reflection plate 3 and the second reflection plate 6. The small diameter end of the main body 1 is provided with a cylindrical battery room 14 which is disposed apart from the convex surface of the first reflection plate 3. An oscillator mounted substrate 13 is fitted in with a groove 12 formed in the inner circumferential surface of the main body 1 and serves as a partition between the room A and the battery room 14. The rear end of the battery room 14 is openably covered with a lid 14a. The front panel 5 is provided with a switch 10 for actuating the acoustic generators and with a pilot lamp 11. ON or OFF operation of the switch 10 brings about connection or disconnection among a battery 15 accommodated in the battery room 14, the oscillator mounted substrate 13 and the acoustic generators 7. When the switch 10 is turned on, the pilot lamp 11 is lighted to indicate that the device is actuated.

Denoted by 18 is an alligator clip having the base end of one of the grasping arms 19 thereof provided integrally with a sphere 17a. The sphere 17a is nipped between a pair of brackets 16 projecting from the outer peripheral wall of the battery room 14, brought into slide fitting in opposed swivel washers 17 of the brackets 16, and rotatably grasped between the opposed swivel washers 17 by fastening the pair of brackets 16 with a thumbscrew 20.

With this construction, therefore, the elevation angle of the main body, i.e. the angle at which the acoustic waves are to be emitted, can freely be set.

Since the two reflection plates 3 and 6 have their concave (reflecting) surfaces opposed to each other and since the acoustic generators are attached to the concave surface of one of the reflection plates, the acoustic waves generated by the acoustic generators are repeatedly reflected between the two reflection plates 3 and 6 and, due to the phase difference of the acoustic waves, amplified into intense echoes and emitted out of the main body through the outlets 8. Therefore, the device of the present invention manifests its vermin-repelling effect even on an object which is relatively distant.

Further, by using the bellows echo plate 9 as in the illustrated embodiment, the echo effect is increased to obtain echoes intense enough to prevent them from being absorbed in the air. In this case, therefore, the device of the present invention can sufficiently exhibit the vermin-repelling effect even out of doors.

In case where a plurality of acoustic generators are provided, acoustic waves of different frequencies are generated and combined into composite acoustic waves and therefore, the vermin-repelling effect can be further enhanced.

The acoustic waves emitted through the outlets 8 in the front panel 5 are concentrated and directed to an area in a desired direction without being dispersed. According to the present invention, therefore, noxious insects in an area to be subjected to use of the present device, such as in outdoor parties, outdoor work in a given place, etc. can be repelled with high efficiency.

What is claimed is:

1. An acoustic vermin-repellent device comprising a trumpet-shaped main body, a first bowl-shaped reflection plate disposed in the vicinity of the small diameter end portion within said trumpet-shaped main body, a second bowl-shaped reflection plate disposed in the vicinity of the large diameter end portion within said trumpet-shaped main body so as to have its concave surface opposed to the concave surface of said first bowl-shaped reflection plate, an acoustic generator attached to the concave surface of said second bowl-shaped reflection plate so as to be directed to the concave surface of said first bowl-shaped reflection plate, actuating means for causing said acoustic generator to fulfill its function, and a plurality of outlets formed around said second bowl-shaped reflection plate for emitting out of said trumpet-shaped main body acoustic waves to be generated by said acoustic generator.

2. An acoustic vermin-repellent device according to claim 1, wherein said actuating means comprises a battery accommodated in a battery room which is attached to the small diameter end of said trumpet-shaped main body, an oscillator mounted substrate interposed between said battery room and the small diameter end of said trumpet-shaped main body, and a switch disposed near the convex surface of said second bowl-shaped reflection plate.

3. An acoustic vermin-repellent device according to claim 1, wherein said acoustic generator comprises a composite of a metallic plate and ceramics, a cylinder having its upper end fixed to the lower edge portion of said composite and its lower end attached to the second bowl-shaped reflection plate, and a pair of electrodes.

4. An acoustic vermin-repellent device according to claim 1, wherein the concave surface of said second bowl-shaped reflection plate is provided with a plurality of acoustic generators which are arranged symmetrically relative to imaginary lines intersecting the center of the concave surface of said second bowl-shaped reflection plate at positions as close to the circumferential edge portion of said second bowl-shaped reflection plate as possible.

5. An acoustic vermin-repellent device according to claim 1, further comprising a bellows echo plate attached to the inner circumferential surface of said trumpet-shaped main body between said first bowl-shaped reflection plate and said second bowl-shaped reflection plate so as to enhance the echo effect.

6. An acoustic vermin-repellent device according to claim 1, further comprising a bowl-shaped front panel attached to the inner circumferential surface in the vicinity of the large diameter end portion of said trumpet-shaped main body for stopping up the front opening of said trumpet-shaped main body, provided with a plurality of outlets for emitting acoustic waves out of said trumpet-shaped main body, and having said second bowl-shaped reflection plate attached thereto.

7. An acoustic vermin-repellent device according to claim 2, further comprising an alligator clip having its base end rotatably attached to said battery room so as to allow the front opening of said trumpet-shaped main body to be directed in a desired direction.

* * * * *